United States Patent
Sahoo et al.

(10) Patent No.: US 9,247,413 B1
(45) Date of Patent: Jan. 26, 2016

(54) METHOD AND APPARATUS FOR FLEXIBLE FAST NETWORK SWITCHING

(71) Applicant: MOTOROLA SOLUTIONS, INC, Schaumburg, IL (US)

(72) Inventors: Brundaban Sahoo, Vernon Hills, IL (US); Michael H Baker, Elmhurst, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 0 days.

(21) Appl. No.: 14/517,168

(22) Filed: Oct. 17, 2014

(51) Int. Cl.
*H04W 8/02* (2009.01)
*H04W 36/14* (2009.01)
*H04W 88/06* (2009.01)

(52) U.S. Cl.
CPC ............. *H04W 8/02* (2013.01); *H04W 36/14* (2013.01); *H04W 88/06* (2013.01)

(58) Field of Classification Search
CPC . H04L 49/351; H04L 49/352; H04L 12/2859; H04L 12/5692; H04Q 2213/13349; H04W 8/02; H04W 36/14; H04W 88/06
See application file for complete search history.

(56) References Cited

U.S. PATENT DOCUMENTS

| 8,406,741 | B2 | 3/2013 | Kang et al. |
| 8,463,265 | B2 | 6/2013 | Rysgaard |
| 8,467,831 | B2 | 6/2013 | Camilleri et al. |
| 8,472,999 | B2 | 6/2013 | Zhang |
| 8,576,901 | B2 | 11/2013 | Tat et al. |
| 2010/0192212 | A1 | 7/2010 | Raleigh |
| 2011/0269503 | A1 | 11/2011 | Park et al. |
| 2015/0026453 | A1* | 1/2015 | Liu et al. ................ 713/151 |

* cited by examiner

*Primary Examiner* — Curtis Odom
(74) *Attorney, Agent, or Firm* — Steven A. May

(57) ABSTRACT

Disclosed herein are methods and systems for flexible fast network switching. In an embodiment, a wireless-communication device has a first chipset compatible with first and second bands and a second chipset compatible with the first band and a third band. The device selects a mode for switching among two or more of the bands. In a first mode with respect to the first and second bands, the device obtains service on the first band via the first chipset. In the first mode with respect to the first and third bands, the device obtains service on the first band via the second chipset. In a second mode with respect to the first and second bands, the device obtains service on the first band via the second chipset. In the second mode with respect to the first and third bands, the device obtains service on the first band via the first chipset.

20 Claims, 12 Drawing Sheets

US 9,247,413 B1

METHOD AND APPARATUS FOR FLEXIBLE FAST NETWORK SWITCHING

BACKGROUND OF THE INVENTION

Many people in today's world engage in various forms of wireless communication via various wireless networks using various wireless-communication devices (WCDs), which are often also or instead referred to using terms such as access terminals, user equipment, mobile radios, mobile stations, mobile devices, and the like. Some example types of commonly used WCDs include cell phones, smartphones, tablets, laptops, mobile Wi-Fi hotspots, and the like.

WCDs are typically equipped, programmed, and configured to be able to engage in one or more types of wireless communication, according to one or more wireless-communication protocols. In a typical arrangement, a WCD includes one or more wireless-communication chipsets for each type of wireless communication in which that device is able to engage; moreover, some chipsets are capable of engaging in multiple types of wireless communication. In general, a given chipset is typically engineered to be compatible with one or more wireless-communication bands, each of which is typically associated with a given wireless network. Some chipsets are compatible with a set of bands that are all associated with the same network, while other chipsets are compatible with a set of bands that includes at least two different bands that are respectively associated with two different networks.

It is often the case that, in order to gain access to a given wireless network using a given chipset, that chipset includes or is connected by circuitry to a security credential for authenticating on that network. One common example form that such a security credential can take is that of a subscriber identity module (SIM), often referred to as a SIM card. Some wireless networks are commercial in nature, and associated WCDs are correspondingly equipped with compatible commercial SIMs; other wireless networks are operated by and/or for public-safety devices, and associated WCDs are correspondingly equipped with compatible public-safety SIMs. And certainly there are other types of SIMs as well.

Moreover, in the context of a WCD being compatible with multiple different wireless networks, it often occurs, for any one of a variety of possible reasons, that the WCD either makes its own determination or receives a (local or remote) command to switch from obtaining wireless service from one network on one band to obtaining wireless service from a different network on a different band. One common example of such a transition is known in the art as roaming. Some example reasons for a given transition from one network to another include loss of coverage and/or service from the first network, mobility of the WCD, relative cost of operating on the networks, network load-balancing considerations, the WCD being "homed" on a given network and not on another, and the like. Accordingly, there is a need for the present methods and systems for flexible fast network switching.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
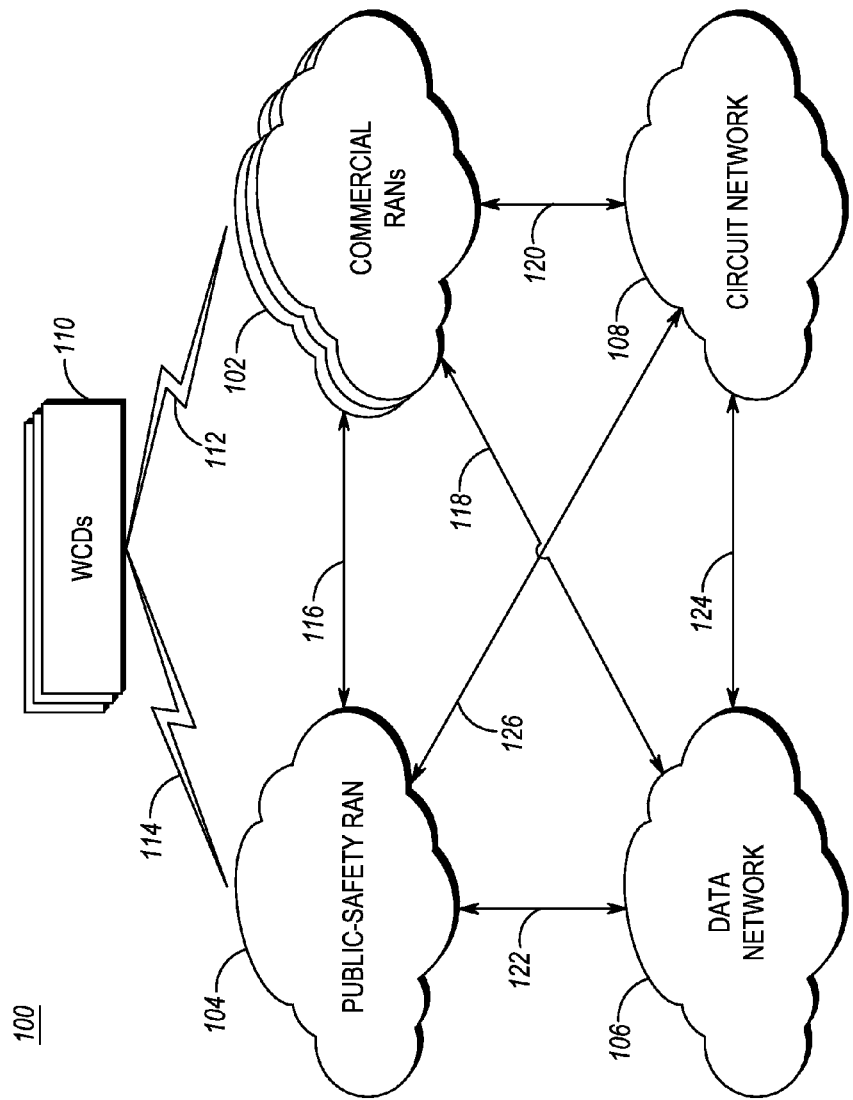
FIG. 1 depicts an example communication system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments. Moreover, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for flexible fast network switching. One embodiment takes the form of a process carried out by a WCD having a first chipset and a second chipset, the first chipset being compatible with each of a first wireless band and a second wireless band, the second chipset being compatible with each of the first wireless band and a third wireless band. The first, second, and third wireless bands are respectively associated with corresponding first, second, and third networks. The process includes selecting a network-switching mode from among a plurality of network-switching modes that each implement switching among two or more of the first, second, and third networks. The plurality of network-switching modes includes first and second network-switching modes. Responsive to selecting the first network-switching mode with respect to the first and second networks, the WCD obtains wireless service on the first wireless band via the first chipset. Responsive to selecting the first network-switching mode with respect to the first and third networks, the WCD obtains wireless service on the first wireless band via the second chipset. Responsive to selecting the second network-switching mode with respect to the first and second networks, the WCD obtains wireless service on the first wireless band via the second chipset. Responsive to selecting the second network-switching mode with respect to the first and third networks, the WCD obtains wireless service on the first wireless band via the first chipset.

An embodiment takes the form of a WCD that includes a communication interface having a first chipset and a second chipset. The first chipset is compatible with each of a first wireless band and a second wireless band, and the second chipset is compatible with each of the first wireless band and a third wireless band. The first, second, and third wireless bands are respectively associated with corresponding first, second, and third networks. The WCD includes a processor, and further includes data storage that contains instructions executable by the processor for causing the WCD to carry out at least the functions recited in the preceding paragraph.

An embodiment takes the form of a WCD that includes a first network-credential interface having access to a first network credential, a second network-credential interface having access to a second network credential, a first chipset that is compatible with a first wireless band, and a second chipset that is compatible with each of the first wireless band and a second wireless band. The first and second wireless bands are respectively associated with corresponding first and second networks. The WCD includes (i) a first direct circuit connection between the first chipset and the first network-credential interface, wherein the WCD is operable to obtain wireless service on the first wireless band via the first chipset at least in part by the first chipset accessing the first network credential over the first direct circuit connection, (ii) a second direct circuit connection between the second chipset and the second network-credential interface, wherein the WCD is operable to obtain wireless service on the second wireless band via the second chipset at least in part by the second chipset accessing the second network credential over the second direct circuit connection, and (iii) an emulated circuit connection between the second chipset and the first network-credential interface, wherein the WCD is operable to obtain wireless service on the first wireless band via the second chipset at least in part by the second chipset accessing the first network credential over the emulated circuit connection.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, switching among networks in a given set of networks while operating according to the first network-switching mode includes roaming among the networks in the given set of networks.

In at least one embodiment, switching among networks in a given set of networks while operating according to the second network-switching mode includes fast-network switching among the networks in the given set of networks.

In at least one embodiment, selecting a network-switching mode includes selecting a network-switching mode based on one or more of: maintenance of session continuity; a time of day; a location of the WCD; a mobility pattern of the WCD; security credentials supported by each of the first and second chipsets; the respective sets of wireless bands supported by each of the first and second chipsets; applications supported by each of the first and second chipsets; applications supported by one or more of the first, second, and third networks; a network load of one or more of the first, second, and third networks; a cost of operating on one or more of the first, second, and third networks; relative ratio of commercial-network coverage to public-safety-network coverage; and a selection of a network from among the first, second, and third networks as a home network for the WCD.

In at least one embodiment in which selecting a network-switching mode includes selecting a network-switching mode based on a selection of a network from among the first, second, and third networks as a home network for the WCD, the following function is also carried out: receiving the selection of the home network from an infrastructure.

In at least one embodiment, selecting a network-switching mode includes selecting a network-switching mode locally at the WCD.

In at least one embodiment, the following function is also carried out: receiving from an access network an indication of whether to select the first network-switching mode or the second network-switching mode; in at least one such embodiment, selecting a network-switching mode includes selecting a network-switching mode based at least in part on the received indication.

In at least one embodiment, exactly two of the first, second, and third networks are operated by a same service provider.

In at least one embodiment, the first network credential is a commercial network credential, the first wireless band is a commercial wireless band, the second network credential is a public-safety network credential, and the second wireless band is a public-safety wireless band.

In at least one embodiment, the WCD further includes a connection controller and an antenna circuit that is connected to the connection controller and to the chipsets. In at least one such embodiment, the antenna circuit receives an indication from the connection controller of the current mode of operation and responsively configures itself accordingly.

In at least one embodiment, the emulated circuit connection includes first and second emulated-circuit-connection modules. In at least one such embodiment, the first emulated-circuit-connection module is configured to communicate with the second chipset and with the second emulated-circuit-connection module. Furthermore, the second emulated-circuit-connection module is configured to communicate with the first emulated-circuit-connection module and with the first network-credential interface. In at least one such embodiment, the first emulated-circuit-connection module resides on the second chipset.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

Figure 2:
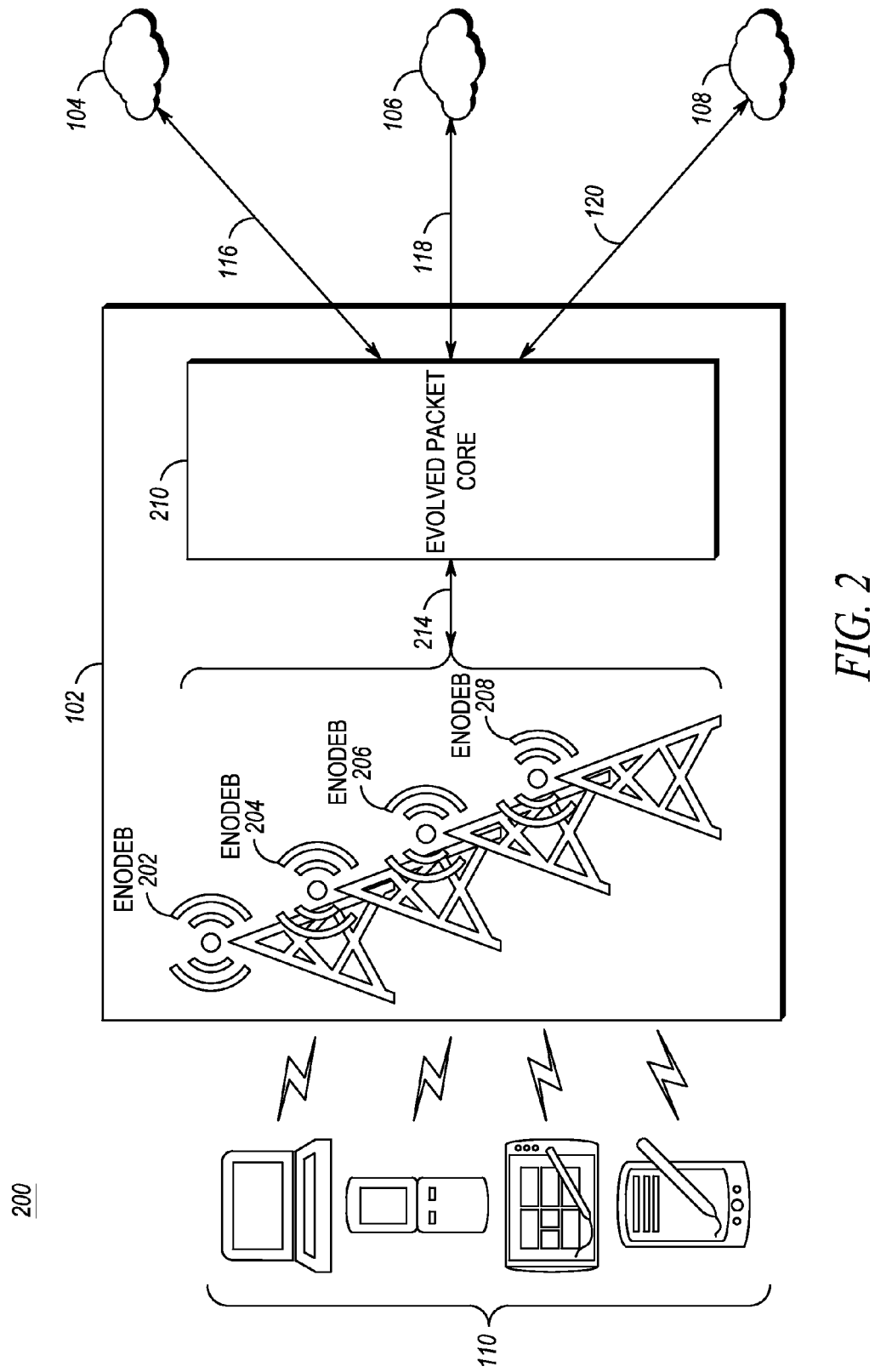
FIG. 2 depicts a further example of the communication system of FIG. 1, in accordance with an embodiment.

The next portion of this disclosure includes descriptions of FIGS. 1-2, which in general depict a communication system in which WCDs communicate via one or more radio access networks (RANs). It is explicitly noted that WCDs that communicate via one or more RANs may also be capable of communicating directly with one another in a manner known by those of skill in the relevant art. Furthermore, mobile radios that are capable of both direct-mode communication and RAN-based communication could certainly carry out and embody the present methods and systems, for which FIGS.

1-2 together help establish an operational context. Herein, many embodiments include reference to one or more networks; therefore, prior to describing these various embodiments, examples of such networks are described immediately below with reference to FIGS. 1-2.

FIG. 1 depicts an example communication system, in accordance with an embodiment. In particular, FIG. 1 depicts an example communication system 100 that includes one or more commercial RANs 102, a public-safety RAN 104, a data network 106, a circuit network 108, WCDs 110, and communication links 112-126.

An example commercial RAN 102 is discussed below in connection with FIG. 2, though in general, each RAN 102 or 104 includes typical RAN elements such as base stations, base station controllers, routers, switches, and the like, arranged, connected, and programmed to provide wireless service to user equipment (e.g., WCDs 110) in a manner known to those of skill in the relevant art.

The public-safety RAN 104 may include one or more packet-switched networks and/or one or more circuit-switched networks, and in general functions to provide one or more public-safety agencies with any necessary computing and communication needs. Thus, the public-safety RAN 104 may include a dispatch center communicatively connected with the data network 106 and also with the circuit network 108, for retrieving and transmitting any necessary public-safety-related data and communications. The public-safety RAN 104 may also include any necessary computing, data-storage, and data-presentation resources utilized by public-safety personnel in carrying out their public-safety functions. Moreover, the public-safety RAN 104 may include one or more network access servers (NASs), gateways, and the like for bridging communications to one or more other entities and/or networks, such as the commercial RANs 102, the data network 106, and the circuit network 108, as representative examples.

The data network 106 may be, include, or be a part of the global network of networks typically referred to as the Internet. The data network 106 may be a packet-switched network, and entities (i.e., servers, routers, computers, and the like) that communicate over the data network 106 may be identified by a network address such as an Internet Protocol (IP) address. Moreover, the data network 106 may include one or more NASs, gateways, and the like for bridging communications to one or more other entities and/or networks, such as the commercial RANs 102, the public-safety RAN 104, and the circuit network 108, as representative examples.

The circuit network 108 may be, include, or be a part of the circuit-switched telephone network commonly referred to as the public switched telephone network (PSTN), and in general functions to provide circuit-switched communications to various communication entities as is known in the relevant art. Moreover, the circuit network 108 may include one or more NASs, gateways, and the like for bridging communications to one or more other entities and/or networks, such as the commercial RANs 102, the public-safety RAN 104, and the data network 106, as representative examples.

The WCDs 110 may be any suitable computing and communication devices configured to engage in wireless communication with one or both of (i) the commercial RANs 102 over communication link 112 (e.g., an air interface) as is known to those in the art and (ii) the public-safety RAN 104 over an communication link 114 (e.g., an air interface) as is known to those in the art. Some example WCDs 110, communication links 112, and communication links 114 are discussed below in connection with the various figures.

The depicted communication system 100 includes communication links 112-126, any one or more of which could include one or more wireless links and/or one or more wired links. In FIG. 1, the communication links 112 and 114 are depicted with respective lightning-bolt graphics; while this graphic typically denotes wireless communication, and does in this example as well, this is not to the exclusion of one or more of the other communication links 116-126 being or at least including wireless-communication links as well.

As can be seen in FIG. 1, the communication link 112 (as mentioned above) connects the commercial RANs 102 and the WCDs 110, the communication link 114 (as mentioned above) connects the public-safety RAN 104 and the WCDs 110, the communication link 116 connects the commercial RANs 102 and the public-safety RAN 104, the communication link 118 connects the commercial RANs 102 and the data network 106, the communication link 120 connects the commercial RANs 102 and the circuit network 108, the communication link 122 connects the public-safety RAN 104 and the data network 106, the communication link 124 connects the data network 106 and the circuit network 108, and the communication link 126 connects the public-safety RAN 104 and the circuit network 108. This arrangement is provided purely by way of example, as other arrangements could be implemented by those of skill in the relevant art in various different contexts.

FIG. 2 depicts a further example of the communication system of FIG. 1, in accordance with an embodiment. FIG. 2 depicts the communication system 100 in more detail regarding some example WCDs 110 and an example RAN 102. In particular, FIG. 2 depicts the RAN 102 as including an eNodeB 202, an eNodeB 204, an eNodeB 206, and an eNodeB 208, each of which communicate directly or indirectly with an evolved packet core (EPC) 210 over a communication link 214. As is the case with each of the communication links mentioned above, and as is the case with any of the communication links mentioned anywhere else in this disclosure, the communication link 214 may be or include one or more wireless-communication links and/or one or more wired-communication links, as deemed suitable by those of skill in the relevant art in a given context.

In at least one embodiment, each of the eNodeBs 202-208 include the hardware and software (and/or firmware) necessary for that eNodeB to function as an eNodeB, a NodeB, a base station, a base transceiver station (BTS), a WiFi access point, and/or the like, as known to those having skill in the art. In some instances, one or more of the eNodeBs in the example RAN 102 may also include functionality typically associated in the art with entities that are often referred to by terms such as base station controllers (BSCs), radio network controllers (RNCs), and the like. Also, while four eNodeBs are depicted by way of example in FIG. 2, any suitable number of eNodeBs could be deployed as deemed suitable by those of skill in the art.

In general, each eNodeB 202-208 is an entity that, on one side (i.e., the wireless-network side (interface)), engages in wireless communication over the air interface 112 with one or more WCDs 110 according to a protocol such as LTE or the like and, on the other side (i.e., the "backhaul" side), engages in communications with the EPC 210 via the communication link 214, to facilitate communications between various WCDs 110 and networks such as the networks 104, 106, and 108.

The EPC 210 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the WCDs 110 via the eNodeBs 202-208, and to bridge such wireless service with various transport networks. In general, an example RAN 102 may provide wireless service according to a protocol such as LTE, 3G, WiFi, and/or the like. These examples are provided for illustration and not by way of limitation; moreover, those of skill in the relevant art are aware of variations among different protocols and among different implementations of a given protocol, and of similarities across different protocols.

Before proceeding with the descriptions of FIGS. 3-12, it is noted that this disclosure references, among other aspects, wireless bands and chipsets. In many of the following figure descriptions, a limited number of wireless bands are described as being located in, associated with, compatible with, or part of the chipsets. In some descriptions, the chipsets are said to communicate via the wireless band. In certain cases a WCD is said to connect to a certain band via a chipset. These forms of descriptions are meant to convey the same concept (that a certain chipset is employed to communicate using a certain band), as will be appreciated by those in the art.

The various wireless bands are references to various radio spectrum frequency bands. A wireless band is a relatively small section of the spectrum of radio communication frequencies, in which channels are usually used or set aside for the same purpose. The limited number of these bands discussed in relation to each chipset is not meant to indicate that the stated bands are the only bands compatible with each chipset. In many cases, the chipsets may contain the necessary hardware and configuration parameters to communicate via a large number of wireless bands (e.g., 8 or more wireless bands per chipset) and the WCD containing such chipsets would be configured to utilize (or at least to be able to utilize) these additional spectral resources. The relatively small number of bands discussed herein is not meant to limit the form of the associated chipsets in any way. Moreover, in addition to the chipsets of the WCDs, this scalability extends to RF front ends of WCDs as well. Examples of components in RF front ends of WCDs that can be band-specific in various different implementations include band-specific power amplifiers and filters in the transmit portion of the respective RF front ends. And certainly other examples could be listed as well. The conscious omission of greater numbers of bands in the FIGS. and their corresponding descriptions is purely for the sake of visual simplicity and literary minimalism, respectively. Consequently, certain embodiments include chipsets that are able to communicate with more networks than are explicitly discussed herein.

Figure 3:
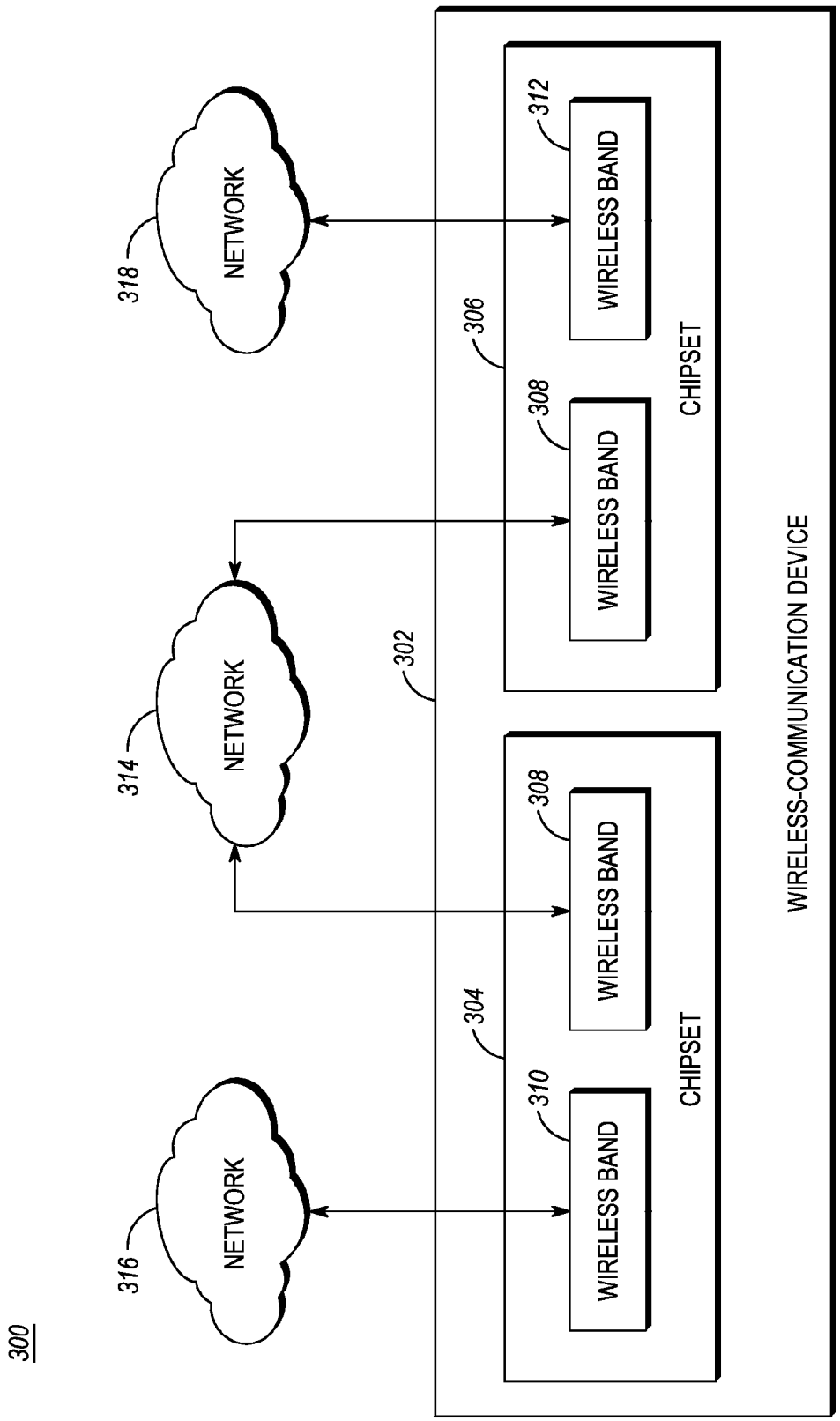
FIG. 3 depicts a first example WCD, in accordance with an embodiment.

FIG. 3 depicts a first example WCD, in accordance with an embodiment. In particular, FIG. 3 depicts an example scenario 300 in which an example WCD 302 is able to communicate with a network 314, a network 316, and a network 318. More specifically, the example WCD 302 includes a chipset 304 that is able to communicate via each of a wireless band 308 (which could be a 3G band, a 4G band, and/or any other suitable type of wireless band) and a wireless band 310 (which also could be a 3G band, a 4G band, and/or any other suitable type of wireless band), and a chipset 306 that is able to communicate via each of the wireless band 308 and a wireless band 312. The wireless band 308 is associated with the network 314; that is to say, the example WCD 302 communicates with the network 314 via the wireless band 308. Furthermore, the wireless band 310 is associated with the network 316, and the wireless band 312 is associated with the network 318.

The example WCD 302 may include one or more integrated circuits (for communicating according to, e.g., LTE, 3G, WiFi, Bluetooth, Ethernet, USB, and/or one or more other protocols). As such, the example WCD 302 may include any necessary hardware (e.g., chipsets, antennas, Ethernet cards, etc.), any necessary firmware, and any necessary software for conducting one or more forms of communication with one or more other entities (e.g., the depicted networks 316-318) as described herein.

In at least one embodiment in which a WCD such as the example WCD 302 is arranged, programmed, and configured to carry out processes such as the process 400 described below in reference to FIG. 4, a set of program instructions are executable by a processor for carrying out those processes; in instances where other entities described herein have a structure similar to that of the example WCD 302, the respective program instructions for those respective devices are executable by their respective processors to carry out functions respectively performed by those devices.

In various embodiments, a device such as the example WCD 302 could be suitably equipped, programmed, and configured to carry out the one or more functions described in this disclosure as being carried out by any one or any combination of the entities described herein and/or any other suitable WCDs. In some embodiments, a device or system such as the example WCD 302 is equipped, programmed, and configured to carry out the process 400 that is described below. Moreover, any one or more of the entities described herein could have an architecture or arrangement similar to that described in connection with the example WCD 302.

In at least one embodiment, none of the first, second, and third networks are operated by a same service provider. In at least one embodiment, exactly two of the first, second, and third networks are operated by a same service provider.

Figure 4:
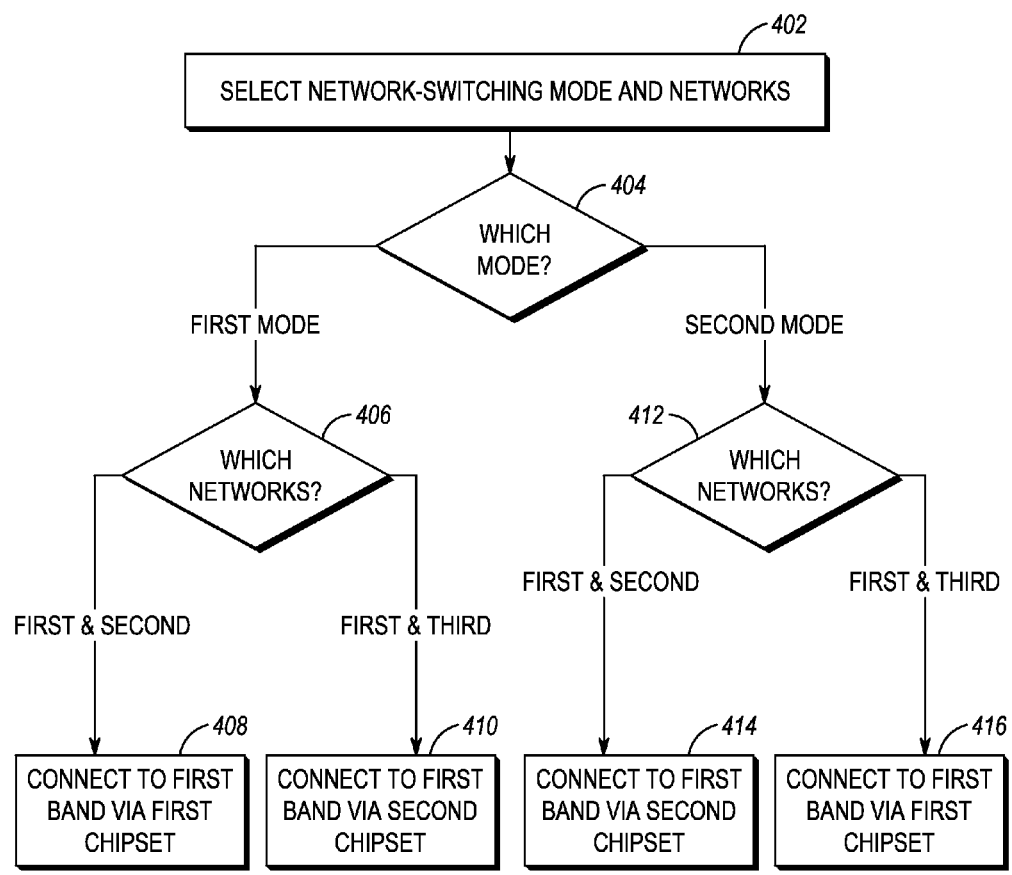
FIG. 4 depicts an example process carried out by a WCD, in accordance with an embodiment.

FIG. 4 depicts an example process carried out by a WCD, in accordance with an embodiment. In particular, FIG. 4 depicts an example process 400 that includes elements 402-416 that could be carried out by the WCD 302 of FIG. 3, the WCD 500 of FIGS. 5-6, the WCD 700 of FIGS. 7-12, and/or any other WCD deemed suitable by those with skill in the relevant art.

At step 402, the WCD selects (i) a network-switching mode from among a plurality of network-switching modes, and (ii) two networks from a set of a first, second, and third networks. Each of the network-switching modes implements switching among two or more of the first, second, and third networks. The plurality of network-switching modes includes a first-network switching mode and a second network-switching mode. Elements 404, 406 and 412 help to visually organize the various mutually exclusive steps 408, 410, 414, and 416.

At step 408, responsive to selecting the first network-switching mode with respect to the first and second networks, the WCD obtains wireless service on the first wireless band via the first chipset. At step 410, responsive to selecting the first network-switching mode with respect to the first and third networks, the WCD obtains wireless service on the first wireless band via the second chipset. At step 414, responsive to selecting the second network-switching mode with respect to the first and second networks, the WCD obtains wireless service on the first wireless band via the second chipset. At step 416, responsive to selecting the second network-switching mode with respect to the first and third networks, the WCD obtains wireless service on the first wireless band via the first chipset.

The WCD executes step 402 and then carries out one of the steps 408, 410, 414, or 416 depending on the result of step 402, as clarified by the decision boxes 404, 406, and 412. After completion of the process 400, the WCD may repeat the process 400. The WCD is not required to produce the same result for step 402 during various different iterations of the process 400.

In at least one embodiment, the process further includes a step preceding the step 402. The preceding step includes receiving from an access network an indication of whether to select the first network-switching mode or the second network-switching mode. In at least one such embodiment, selecting the network-switching mode includes selecting the network-switching mode based at least in part on the received indication.

In at least one embodiment, the first network-switching mode as that term is used in this disclosure is roaming, and the second network-switching mode as that term is used in this disclosure is a network-switching mode that is referred to herein as fast-network switching (and that is further discussed below). Thus, in at least one embodiment, switching among networks in a given set of networks while operating according to the first network-switching mode includes roaming among the networks in the given set of networks. For example, if the result of step 402 is a selection of the first mode and the first and third networks, the WCD obtains wireless service on the first wireless band via the second chipset. If the WCD switches from using the first network to using the third network, that switch could take the form of roaming from the first network to the third network. The WCD may determine that such a switch is necessary for a variety of reasons. Some of these reasons include the WCD experiencing poor signal strength, a user selecting a priority order of preferred networks, and many other possibilities as known by those of skill in the art.

As a general matter, roaming requires that an arrangement has been made between two carriers (i.e., service providers). Typically, certain network elements must be built out in order to enable roaming. Each credential in a roaming device typically needs to include a list of roaming frequencies that are available. Moreover, roaming from one network to another can take up to 30 seconds. As a general observation, roaming is an approach that is often used when a relatively large carrier acquires a relatively small carrier, in order to gain access to the small carrier's spectral resources. Moreover, it is expected that, in the future, public-safety networks will establish roaming arrangements with more than one domestic service provider.

Continuing the above discussion, then, in at least one embodiment, switching among networks in a given set of networks while operating according to the second network-switching mode includes fast-network switching among the networks in the given set of networks. For example, if the result of step 402 is a selection of the second mode and the first and second networks, the WCD obtains wireless service on the first wireless band via the second chipset. If the WCD switches from using the first network to using the second network, that switch could constitute a fast network switch from the first network to the second network. The WCD may determine that such a switch is necessary for a variety of reasons. Some of these reasons include the WCD experiencing poor signal strength, a user selecting a preferred network, and many other possibilities that could be listed here.

As the term is used in this disclosure, a fast network switch involves a WCD switching from (i) communicating over a particular wireless band via one chipset to (ii) communicating over a different wireless band via another chipset. A dual-subscription WCD is able to establish the latter of those two connections (using the other chipset and the different wireless band) while the former of those two connections (using the first chipset and the particular wireless band) remains active. This enables the WCD to make its new connection before it breaks its old connection. And while the make-before-break variety of fast-network switching has certain advantages such as providing the ability to maintain session continuity, the term fast-network switching includes break-before-make varieties as well.

In at least one embodiment, selecting a network-switching mode includes selecting a network-switching mode locally at the WCD. In at least one embodiment, selecting a network-switching mode includes selecting a network-switching mode based on a selection of a network from among the first, second, and third networks as a home network for the WCD. In at least one such embodiment, the method further includes receiving the selection of the home network from an infrastructure.

As a general matter, selecting a network-switching mode can be carried out based on one or more of a wide variety of criteria. In at least one embodiment, selecting a network-switching mode includes selecting a network-switching mode based on one or more of: maintenance of session continuity; a time of day; a location of the WCD; a mobility pattern of the WCD; security credentials supported by each of the first and second chipsets; the respective sets of wireless bands supported by each of the first and second chipsets; applications supported by each of the first and second chipsets; applications supported by one or more of the first, second, and third networks; a network load of one or more of the first, second, and third networks (at a site of a given incident and perhaps also at one or more sites of one or more neighboring incidents); a cost of operating on one or more of the first, second, and third networks; relative ratio of commercial-network coverage to public-safety-network coverage; and a selection of a network from among the first, second, and third networks as a home network for the WCD. These various example criteria are further discussed below. And it is further noted that, other than the last criterion in the previous list (i.e., the selection of a network from among the first, second, and third networks as a home network for the WCD), any one or more of the other criteria in the previous list could be used in various different embodiments to in fact select a given network as being the home network for the WCD.

As mentioned above, in at least one embodiment, a network-switching mode is selected by or for a given WCD based at least in part on maintenance of session continuity. That is, a given network-switching mode could be selected so that session continuity can be maintained during a switch of networks according to the selected network-switching mode. In some cases, a determination that maintaining session continuity is important is based at least in part on whether the WCD is currently using or is about to use an application that has been deemed mission-critical.

Some examples of communication applications that may well be deemed mission-critical include voice over LTE (VoLTE), capturing of video using a personnel-mounted (e.g., officer-mounted) video camera, push-to-talk (PTT), tunneled PTT (a.k.a. backup PTT) (e.g., if a given WCD leaves land mobile radio (LMR) range, and then communicates via a pipe (e.g., an LTE pipe) over a broadband connection into order to continue mission-critical PTT communication), remote location tracking, and real-time location reporting (during, e.g., in-building operations), though certainly numerous other example applications could be listed that may be deemed mission-critical in a given context.

There are a number of implementation options for ways in which a given WCD and/or network infrastructure can identify that a given application has been deemed mission-critical, such that maintenance of session continuity should be a priority, such that selection of, for example, fast-network switching as a network-switching mode would be preferable to selecting roaming as a network-switching mode. In some instances, a public-safety agency or other agency or organization may define a given set of communication applications as being mission-critical communication applications, and may populate this information as appropriate across network-infrastructure elements and to WCDs as well. In some instances, applications deemed mission-critical may be systematically associated with relatively higher Quality of Service (QoS) Class Identifier (QCI) values as opposed to the QCI values with which non-mission-critical communication applications are systematically associated. And certainly other possible implementations could be listed here as well.

In instances in which continuity of a given session is to be maintained, this could be accomplished in a number of different ways. One option is to maintain session continuity using a technology known in the art as mobile virtual private network (MVPN). Moreover, in addition to maintaining session continuity using an approach such as MVPN, a given network entity can also buffer session data during the time it takes to complete a network-switching operation such as a fast-network switch as that term is used herein. Often this amount of time will be on the order of approximately three seconds or less. Any buffered data could then be made available to a given user as soon as the fast-network switch is complete, or perhaps the fast-network-switch completion would be followed by a reconnection to a real-time data stream, in which case the buffered data could be made available for later playout to a given user. In some cases, an MVPN tunnel that is used before and after a fast-network switch can help by buffering some content at the WCD itself while the WCD is still connected to the first network, taking advantage of the make-before-break nature of many fast-network-switch operations. And certainly many other example implementations could be listed.

As mentioned above, in at least one embodiment, a network-switching mode is selected by or for a given WCD based at least in part on the time of day. That is, a given network-switching mode could be programmatically selected as the operating network-switching mode during some times of the day, and another network-switching mode could be selected as the operating network-switching mode for other times of the day. And certainly numerous time periods could be delineated on different days, perhaps distinguishing weekdays from weekend days, and the like.

As mentioned above, in at least one embodiment, a network-switching mode is selected by or for a given WCD based at least in part on the location of the WCD. That is, a given network-switching mode could be programmatically selected as the operating network-switching mode at a first set of one or more locations, and another network-switching mode could be programmatically selected as the operating network-switching mode at a second set of one or more locations. In various different embodiments, current location can be identified using factors such as longitude and latitude, GPS data, triangulation data, cell-site-location data, and the like.

As mentioned above, in at least one embodiment, a network-switching mode is selected by or for a given WCD based at least in part on the mobility pattern of the WCD. That is, a given network-switching mode could be selected as the default network-switching mode for a given WCD when that WCD is on its home network, and a different network-switching mode could be selected as the default network-switching mode for the given WCD when that WCD is not on its home network. This may be useful in situations where the given WCD is associated with a user that frequently travels and is therefore frequently on a network other than its home network. In another example, a given public-safety officer may be assigned to work in a geographical region that is at or near the edge of two different networks; in such a case, it may be preferred that the WCD operate in a fast-network-switching mode as opposed to a roaming mode, for at least the reason that transitions between networks generally take less time as fast-network switches than as roaming transitions, and such a difference would only be amplified in a context in which numerous such network transitions would be likely to occur.

It is also separately noted that signal quality of a given network on which service is provided in a work-assignment area of a given public-safety officer may be such that the WCD of that given public-safety officer would be better served homing on the given network while working such an assignment. And certainly numerous other examples could be listed as well regarding manners in which respective mobility patterns of WCDs could direct network-switching-mode selection and/or current-home-network selection. As stated above, other than the criterion regarding which network is a given WCD's home network, any of the other criteria listed in this section of this disclosure could be used for network-switching-mode selection and/or for current-home-network selection.

As mentioned above, in at least one embodiment, a network-switching mode is selected by or for a given WCD based at least in part on the respective security (i.e., network) credentials supported by each of the first and second chipsets. Indeed, it may be the case that multiple service providers agree to authenticate various WCDs based on the same SIM card or other credential (perhaps in a situation where multiple different service providers provide LTE service on various different bands in a given geographical area). Such a situation may influence network-switching-mode selection, perhaps to increase the likelihood in a given scenario that a given WCD will make any necessary or desired network-to-network transitions on the same SIM card. And certainly other examples could be listed.

As mentioned above, in at least one embodiment, a network-switching mode is selected by or for a given WCD based at least in part on the respective sets of wireless bands supported by each of the first and second chipsets. Similar to the description in the previous paragraph, it may be the case that the respective sets of wireless bands that are supported by each of the first and second chipsets influence network-switching-mode selection, perhaps to increase the likelihood that a given WCD will make any necessary or desired network-to-network (or band-to-band) transitions on the same chipset. And certainly other examples could be listed.

As mentioned above, in at least one embodiment, a network-switching mode is selected by or for a given WCD based at least in part on the respective sets of applications supported by each of the first and second chipsets. It may be the case that some applications may be usable in connection with some chipsets but not others. It may be the case that some applications may work better (e.g., operate faster, provide one or more enhanced features, etc.) in connection with some chipsets than with others. And certainly other examples could be listed.

As mentioned above, in at least one embodiment, a network-switching mode is selected by or for a given WCD based at least in part on the respective sets of applications supported by one or more of the first, second, and third networks. This example is somewhat similar to that of the previous paragraph, in that various different chipsets will typically be compatible with various different networks, and some communication applications may be supported on some networks and not on others, and some communication applications may work better (e.g., operate faster, have shorter characteristic restart times, provide one or more enhanced features, etc.) in connection with some networks than with others. Thus, the desirability of operating in a fast-network-switching mode—as opposed to in a roaming mode—may be amplified in the context of communication applications that tend to require a relatively substantial amount of time to restart, as maintenance of session continuity by operation of fast-network-switching operations can preclude the need to restart. And certainly other examples could be listed as well.

On the topic of home-network selection, if may be the case that a given public-safety agency prefers or even requires that certain applications be run or executed a given incident scene, and it may further be the case that such applications perform better on one network (e.g., a public-safety-specific LTE network) than on another network (e.g., a commercial LTE network); in such a scenario, it may be advantageous for a given public-safety WCD to operate with the former as its home network as opposed to the latter. And certainly other examples could be listed as well.

As mentioned above, in at least one embodiment, a network-switching mode is selected by or for a given WCD based at least in part on the respective network loads of one or more of the first, second, and third networks (e.g., at a site of a given incident and perhaps also at one or more sites of one or more neighboring incidents). In one example, a public-safety agency or other organization may select a fast-network-switching mode as opposed to a roaming mode for one or more WCDs to facilitate those one or more WCDs switching networks quickly and with session continuity as loads on various networks dynamically change over time during the duration of a given incident. And on the topic of home-network selection, when the respective device credentials of a given set of WCDs provide multiple home-network options, a given agency can load balance across networks by way of selecting different home networks for different devices, causing the devices to distribute themselves across various networks per their respective home-network designations. And certainly other examples could be listed as well.

As mentioned above, in at least one embodiment, a network-switching mode is selected by or for a given WCD based at least in part on the respective and relative costs of the WCD operating on one or more of the first, second, and third networks. Thus, depending on the various costs of operating on various networks as a homed SIM, operating on various networks using various different SIMs, operating on various networks using various different chipsets, roaming on various networks, and/or the like, computations can be made to estimate, predict, and/or the like the various costs associated with operating in a given set of circumstances in one network-switching mode vs. another; accordingly, a network-switching mode that is associated with a lower relative cost can be selected; and some situations may arise where one or more other advantages of operating on one network vs. another (e.g., signal quality, feature set, and/or the like) may outweigh a given cost savings and counsel towards selecting a relatively more expensive operating mode. And certainly numerous other examples could be listed as well.

As mentioned above, in at least one embodiment, a network-switching mode is selected by or for a given WCD based at least in part on the relative ratio of commercial-network coverage to public-safety-network coverage (or vice versa) (e.g., at a given location). Indeed, it may be the case that, depending on the degrees of commercial coverage and public-safety coverage that are present a location of a given public-safety incident, public-safety work assignment, or the like, an associated public-safety agency may select a given group (i.e., pool) of WCDs to be dispatched to and used at the given location, and may further configure (e.g., by over-the-air instructions) those WCDs to operate in certain network-switching modes and/or to operate with certain selected networks as their home networks. And certainly it is the case that different WCDs that are configured for operation at a given incident scene or the like can be configured to operate in different ways at that scene (e.g., in different network-switching modes and/or homed on different networks). Moreover, one or more such WCDs could be configured such that a user, incident-scene commander, and/or the like is able to change network-switching-mode selections and/or home-network selections dynamically at the scene of an incident. And certainly numerous other implementation examples could be listed here as well.

As mentioned above, in at least one embodiment, a network-switching mode is selected by or for a given WCD based at least in part on the selection of a network from among the first, second, and third networks as a home network for the WCD. Thus, a WCD could be instructed (e.g., remotely or via a local user interface) and/or programmed to prefer (i) having (a) roaming access to a first example band that is supported on its first chipset but not on its second chipset and (b) fast-network-switching access to a second example band that is supported on its second chipset but not on its first chipset over (ii) having (a) roaming access to the second example band and (b) fast-network-switching access to the first example band. In such a scenario, the WCD would be best served by homing on a band (other than the first example band) that is supported on its first chipset. And certainly numerous other illustrative examples could be listed here.

Figure 5:
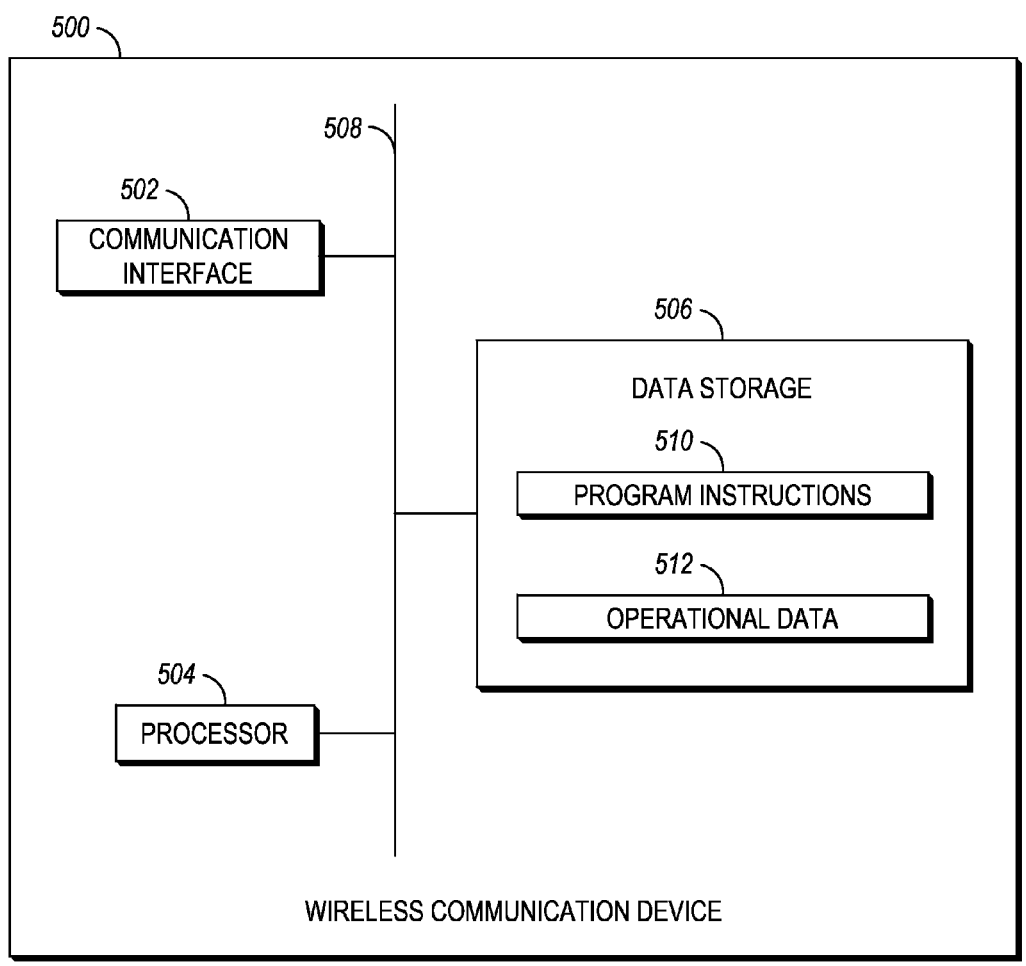
FIG. 5 depicts a second example WCD, in accordance with an embodiment.

FIG. 5 depicts a second example WCD, in accordance with an embodiment. In particular, FIG. 5 depicts an example WCD 500 as including a communication interface 502, a processor 504, and a data storage 506, all of which are communicatively coupled with one another via a system bus (or other suitable communication mechanism, connection, network, or the like) 508.

The communication interface 502 may include one or more wireless-communication interfaces (for communicating according to, e.g., LTE, 3G, WiFi, Bluetooth, and/or one or more other protocols) and/or one or more wired-communication interfaces (for communicating according to, e.g., Ethernet, USB, and/or one or more other protocols). As such, the communication interface 502 may include any necessary hardware (e.g., chipsets, antennas, Ethernet cards, etc.), any necessary firmware, and any necessary software for conducting one or more forms of communication with one or more other entities as described herein. The processor 504 may include one or more processors of any type deemed suitable by those of skill in the relevant art, some examples including a general-purpose microprocessor and a dedicated digital signal processor (DSP).

The data storage 506 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 5, the data storage 506 contains program instructions 510 executable by the processor 504 for carrying out various functions, as well as operational data 512.

Moreover, while FIG. 5 explicitly depicts program instructions (i.e., the program instructions 510) contained in a data storage (i.e., the data storage 506) and executable by a processor (i.e., the processor 504), and while the WCDs that are depicted in FIGS. 3 and 7-12 are not explicitly depicted as having processors, data storage, and executable instructions, those latter depictions are simplified in that sense in order to more clearly depict other aspects and alternatives that are particularly relevant to those figures. This manner of depiction in no way implies the absence of elements such as processors, data storage, and executable instructions.

In an embodiment in which a WCD such as the example WCD 500 is arranged, programmed, and configured to carry out processes such as the process 400 described above, the program instructions 510 are executable by the processor 504 for carrying out those functions; in instances where other entities described herein have a structure similar to that of the example WCD 500, the respective program instructions 510 for those respective devices are executable by their respective processors 504 to carry out functions respectively performed by those devices.

In various embodiments, a device such as the WCD 500 could be suitably equipped, programmed, and configured to carry out the one or more functions described in this disclosure as being carried out by any one or any combination of the entities described herein and/or any other suitable WCDs. In some embodiments, a device or system such as the WCD 500 is equipped, programmed, and configured to carry out the process 400 that is described above. Moreover, any one or more of the entities described herein could have an architecture or arrangement similar to that described in connection with the example WCD 500.

Figure 6:
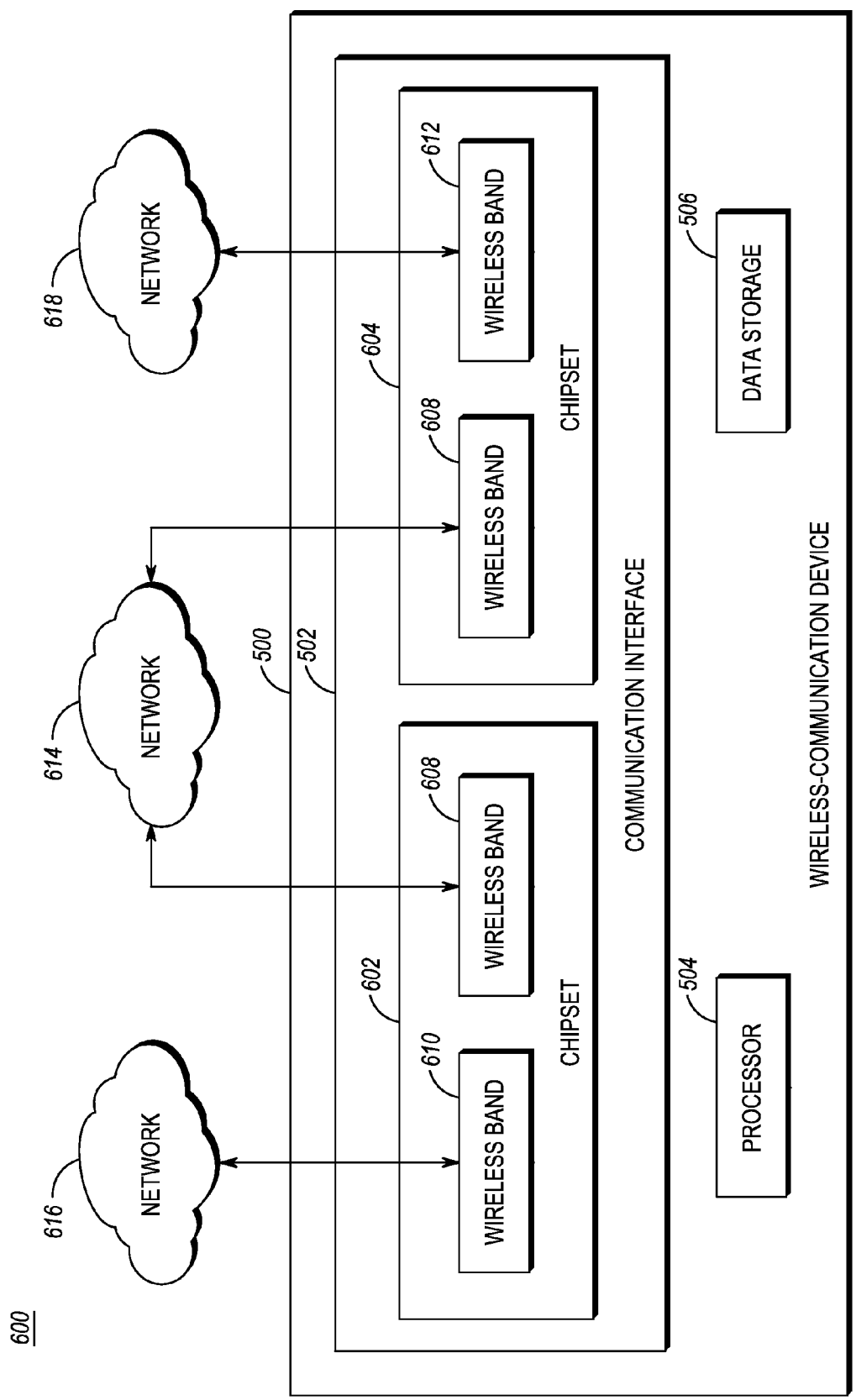
FIG. 6 depicts a further example of the WCD of FIG. 5, in accordance with an embodiment.

FIG. 6 depicts a further example of the WCD of FIG. 5, in accordance with an embodiment. In particular, FIG. 6 depicts an example scenario 600 in which the example WCD 500 of FIG. 5 is illustrated in greater detail. As depicted in FIG. 6, the WCD 500 is able to communicate with a network 614, a network 616, and a network 618. More specifically, the example WCD 500—and in particular the communication interface 502—includes (i) a chipset 602 that is able to communicate via each of a wireless band 608 and a wireless band 610 and (ii) a chipset 604 that is able to communicate via each of the wireless band 608 and a wireless band 612. The wireless band 608 is associated with the network 614; that is to say, the WCD 500 communicates with the network 614 via the wireless band 608. Furthermore, the wireless band 610 is associated with the network 616, and the wireless band 612 is associated with the network 618. The chipset 602 is compatible with networks 614 and 616. The chipset 604 is compatible with networks 614 and 618.

Figure 7:
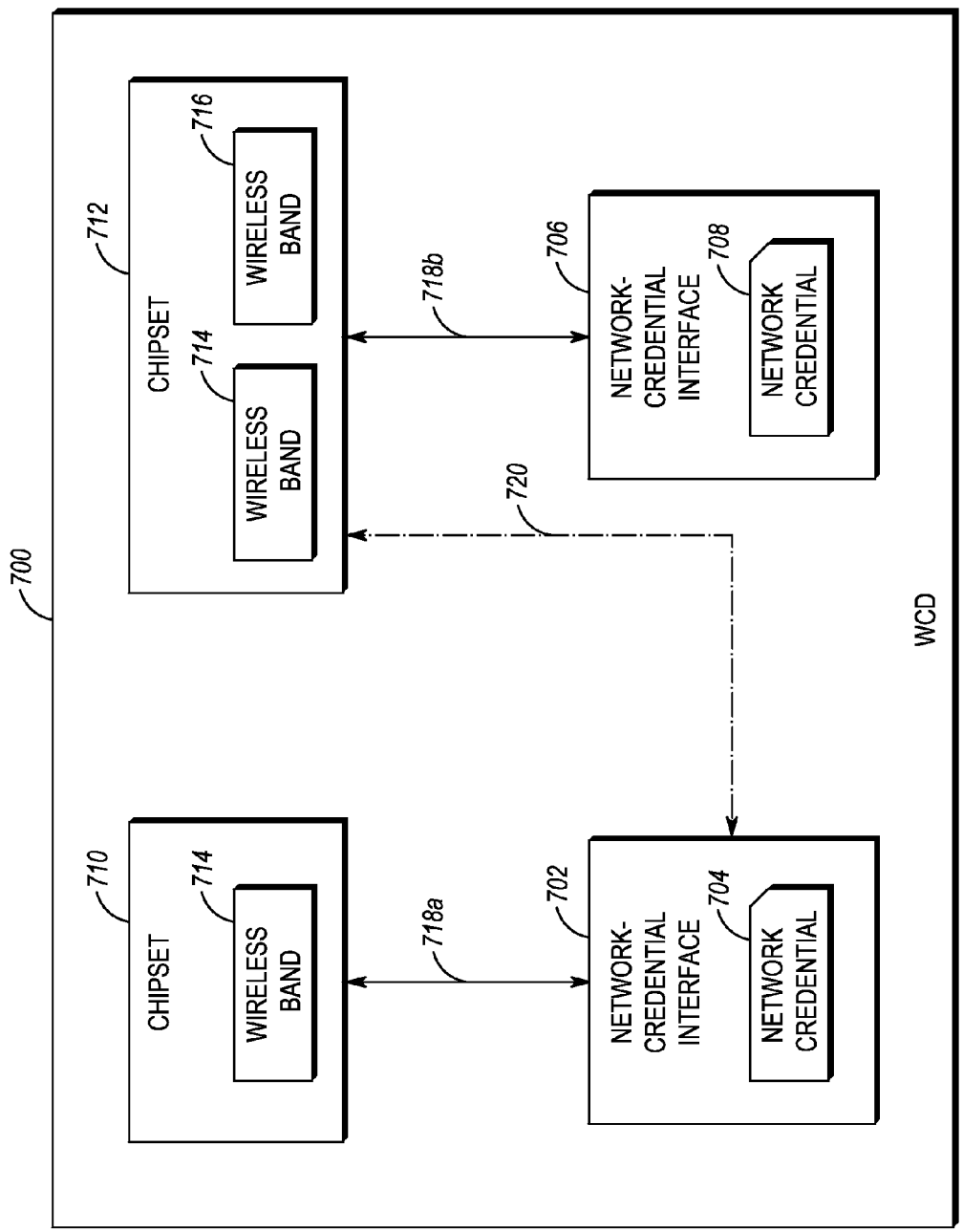
FIG. 7 depicts a third example WCD, in accordance with an embodiment.

FIG. 7 depicts a third example WCD, in accordance with an embodiment. In particular, FIG. 7 depicts an example WCD 700 that includes a first network-credential interface 702 having access to a first network credential 704, a second network-credential interface 706 having access to a second network credential 708, a first chipset 710 that is compatible with a first wireless band 714, and a second chipset 712 that is compatible with each of the first wireless band 714 and a second wireless band 716. The first and second wireless bands 714 and 716 are respectively associated with corresponding first and second networks.

The example WCD 700 further includes a first direct circuit connection 718a between the first chipset 710 and the first network-credential interface 702. The example WCD 700 is operable to obtain wireless service on the first wireless band 714 via the first chipset 710 at least in part by the first chipset 710 accessing the first network credential 704 over the first direct circuit connection 718a. The example WCD 700 further includes a second direct circuit connection 718b between the second chipset 712 and the second network-credential interface 706. The example WCD 700 is operable to obtain wireless service on the second wireless band 716 via the second chipset 712 at least in part by the second chipset 712 accessing the second network credential 708 over the second direct circuit connection 718b.

The example WCD 700 further includes an emulated circuit connection 720 between the second chipset 712 and the first network-credential interface 702. The example WCD 700 is operable to obtain wireless service on the first wireless band 714 via the second chipset 712 at least in part by the second chipset 712 accessing the first network credential 704 over the emulated circuit connection 720. In at least one embodiment, the emulated circuit connection 720 passes through (i.e., is implemented at least in part by) a host processor (not depicted), and uses a remote application programming interface (remote API) (also not depicted) to connect the second chipset 712 with the first network-credential interface 702.

In at least one embodiment, the first network credential 704 includes a first SIM card and the second network credential 708 includes a second SIM card. In at least one embodiment, the first network credential 704 is a commercial network credential, the first wireless band 714 is a commercial wireless band, the second network credential 708 is a public-safety network credential, and the second wireless band 716 is a public-safety wireless band. Each SIM card may take the form of a full-size SIM, mini-SIM, micro-SIM, or nano-SIM (i.e., a 1FF, 2FF, 3FF or 4FF card), among other possibilities known to those of skill in the relevant art. Each SIM may be embedded or removable depending, among other factors, on the forms of the first network-credential interface 702 and the second network-credential interface 706. Furthermore, each physical card may contain one or more USIM, ISIM, and/or CSIM applications, as examples. In at least one embodiment, the first network credential 704 and the second network credential 708 each include one or more USIM, ISIM, and/or CSIM applications.

Moreover, at least one embodiment is configured for a scenario in which a WCD such as the example WCD 700 contains a particular network credential (e.g., SIM) that is shared by multiple service providers. That is, it can occur that a single SIM includes respective different network credentials for respective different networks operated by different service providers (i.e., carrier networks). Thus, using FIG. 7 as an illustrative example, either or both of the first network credential 704 and the second network credential 708 could contain multiple network credentials that are respectively associated with multiple different networks. In some embodiments, the first network-credential interface 702 includes multiple different network credentials (i.e., the network credential 704 and one or more additional network credentials). In some embodiments, the second network-credential interface 706 includes multiple different network credentials (i.e., the network credential 708 and one or more additional network credentials).

Those of skill in the relevant art will understand that relatively large frequency bands can be delineated into multiple sub-bands, and that different sub-bands may be supported by different service-provider (i.e., carrier) networks in different geographic areas. As one example, an LTE band known as band 14 (B14) could be sub-divided in a particular city into two sub-bands that are each 5×5 MHz-FDD (frequency division duplex) sub-bands. In such an example, two different service providers could provide service and credentials on those two different example sub-bands. And certainly numerous other such examples could be listed. In general, the collection of bands (perhaps including one or more sub-bands) on which a given service provider issues credentials and correspondingly provides service could be contiguous or non-contiguous spectral resources.

In at least one embodiment, the bands supported by the first and second chipsets of the WCD are all LTE bands on which LTE service is provided by multiple different carriers in contiguous and/or non-contiguous sections of the electromagnetic spectrum. In at least one such embodiment, either the first SIM or the second SIM is a commercial SIM, and the other SIM is a public-safety SIM. The WCD can be homed on a commercial LTE band or on a public-safety LTE band. The WCD can be homed using either SIM, and either SIM can contain one network credential for one network or rather can contain multiple different network credentials for multiple different respective networks. And certainly numerous other possibilities could be listed here, given the flexible nature of the presently disclosed systems and methods.

Figure 8:
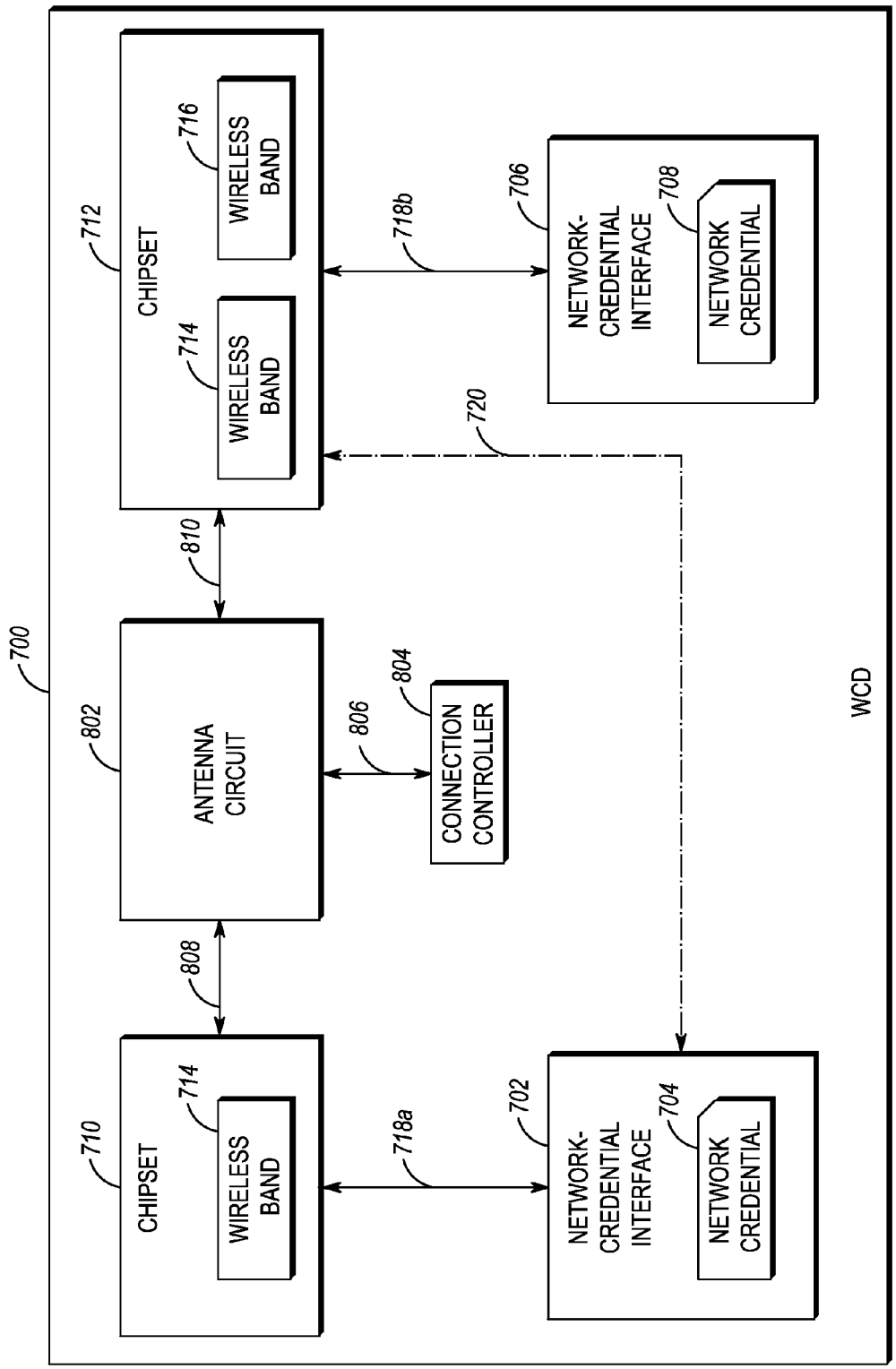
FIG. 8 depicts a further example of the WCD of FIG. 7, in accordance with an embodiment.

FIG. 8 depicts a further example of the WCD of FIG. 7, in accordance with an embodiment. In particular, in the example that is depicted in FIG. 8, the example WCD 700 further includes a connection controller 804 and an antenna circuit 802 that is connected to the connection controller 804 and to the chipsets 710 and 712. The connection controller 804 is connected to the antenna circuit 802 via a connection 806. The antenna circuit 802 is connected to the first chipset 710 via a connection 808 and connected to the second chipset 712 via a connection 810. In at least one embodiment, the antenna circuit 802 receives an indication from the connection controller 804, via the connection 806, of a selected network-switching mode and responsively configures itself accordingly. In one embodiment, the chipsets 710-712 communicate with a RAN via the antenna circuit 802 at least in part by using the connections 808-810 respectively to communicate via the antenna circuit 802.

The antenna circuit 802 may include one or more physical antennas. Those skilled in the art will recognize that RF front-ends with some band-specific components such as filters and amplifiers, and some broadband components in addition to RF-switching circuits may also be included in the antenna circuit 802. In at least one embodiment, the chipsets 710 and 712 share at least one common antenna. The antenna circuit 802 may contain hardware for converting a radio frequency signal into a baseband signal. The antenna circuit 802 may contain hardware for converting a baseband signal into a radio frequency signal. In at least one embodiment, the antenna circuit routes data based at least in part on a network-switching mode indicator that is sent from the connection controller 804.

The connection controller 804 may be an independent integrated circuit or may be combined with some other processing unit (e.g., the processor 504 of FIG. 5). In at least one embodiment, the connection controller is software, implemented as a set of instructions executable by a processor for causing the antenna circuit 802 to carry out a set of functions. The set of functions may include routing signals based at least in part on the selected network-switching mode.

In at least one embodiment, the connection controller 804 includes a functional module referred to here as a mode controller, which makes determinations on one or more bases (such as one or more of the bases or inputs described herein) regarding in which network-switching mode to place the WCD, and which also carries out those determinations using various messages and control signals to various relevant components of the WCD, such as one or more of the chipsets, one or more network-credential interfaces, the antenna circuit, and the like.

In at least one embodiment, the connection controller 804 includes a functional module referred to here as a customized connection manager (CCM). The CCM may carry out channel-monitoring functions (e.g., reference signal received power (RSRP) and/or reference signal received quality (RSRQ). The CCM may carry out one or more hysteresis functions to stabilize network-switching behavior. The CCM may send the mode controller mode-switching and/or network-switching instructions based on channel-monitoring values that the CCM essentially continuously monitors and calculates. In at least one embodiment, one or both of the mode controller and the CCM are executed on (i.e., by) a host processor of a WCD. The CCM may assist the mode controller by providing instructions and/or other information regarding fast-network switches, roaming events, and the like.

The CCM may carry out its functions at least in part by simultaneously monitoring the signal strengths of two different wireless bands by way of the two different chipsets of the WCD. The CCM may carry out additional functions such as validating signal thresholds. Moreover, in addition to assisting the mode controller in making network-switching and/or mode-switching determinations, the CCM may indeed be controlled by the mode controller, in that the mode controller may instruct the CCM to, e.g., monitor particular pairs of signals using one or more chipsets depending on the current network-switching mode of the device. In at least one embodiment, the CCM enables the WCD to perform a fast-network switch in a time period on the order of three seconds or less, thus providing real opportunities for the maintaining of session continuity for mission-critical applications.

Figure 9:
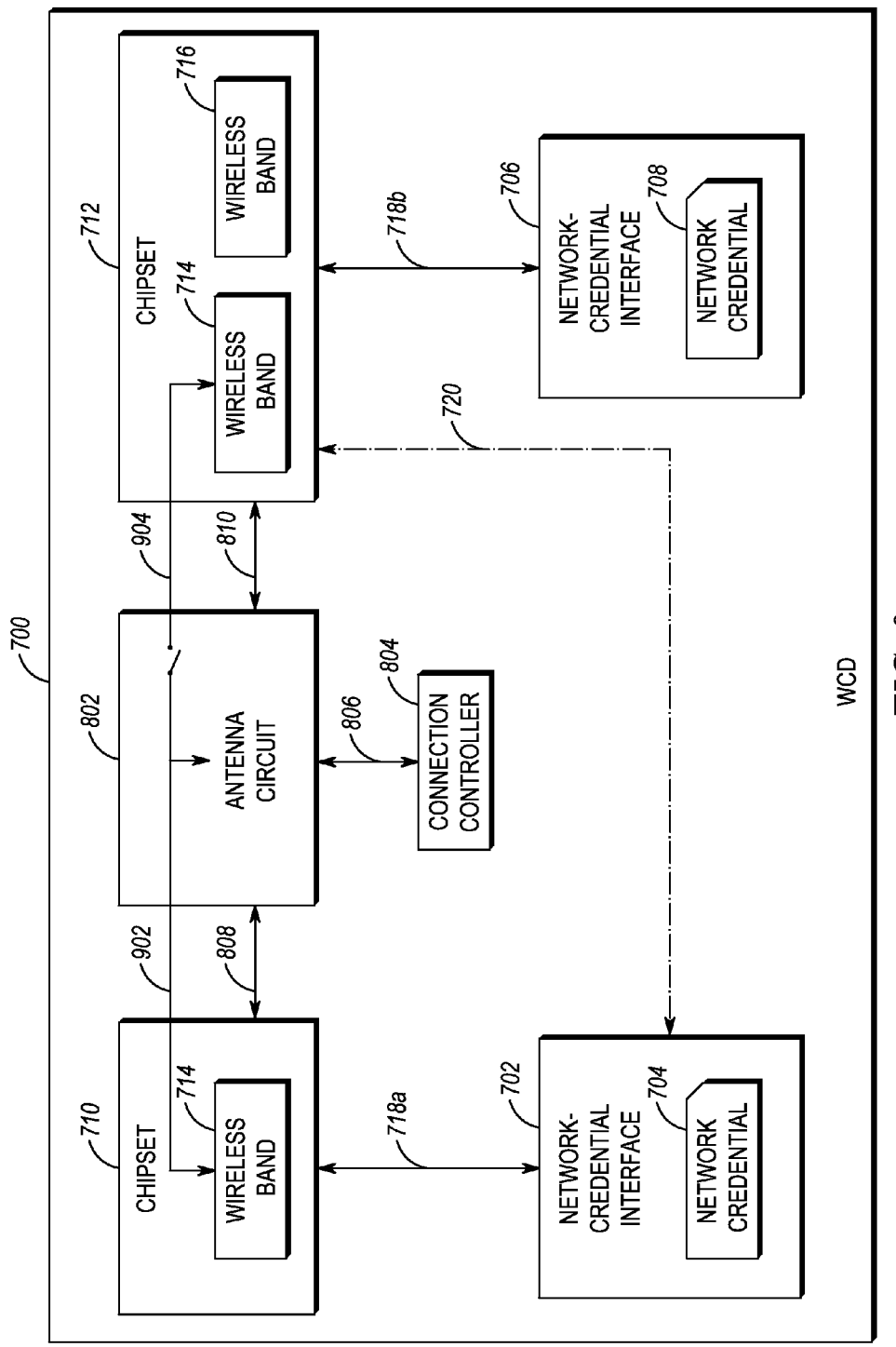
FIG. 9 depicts a further example of the WCD of FIG. 8 in a first mode of operation, in accordance with an embodiment.

FIG. 9 depicts a further example of the WCD of FIG. 8 in a first mode of operation, in accordance with an embodiment. In particular, FIG. 9 depicts the antenna circuit 802 after receiving, from the connection controller 804, an indication that the WCD 700 is in the first network-switching mode. FIG. 9 introduces connections 902 and 904. The connection 902 connects the antenna circuit 802 with the wireless band 714 of the first chipset 710. The connection 904 is a disabled connection between the antenna circuit 802 and the wireless band 714 of the second chipset 712. In the first network-switching mode, the antenna circuit 802 routes data that is sent or received using the wireless band 714 via the first chipset 710.

Figure 10:
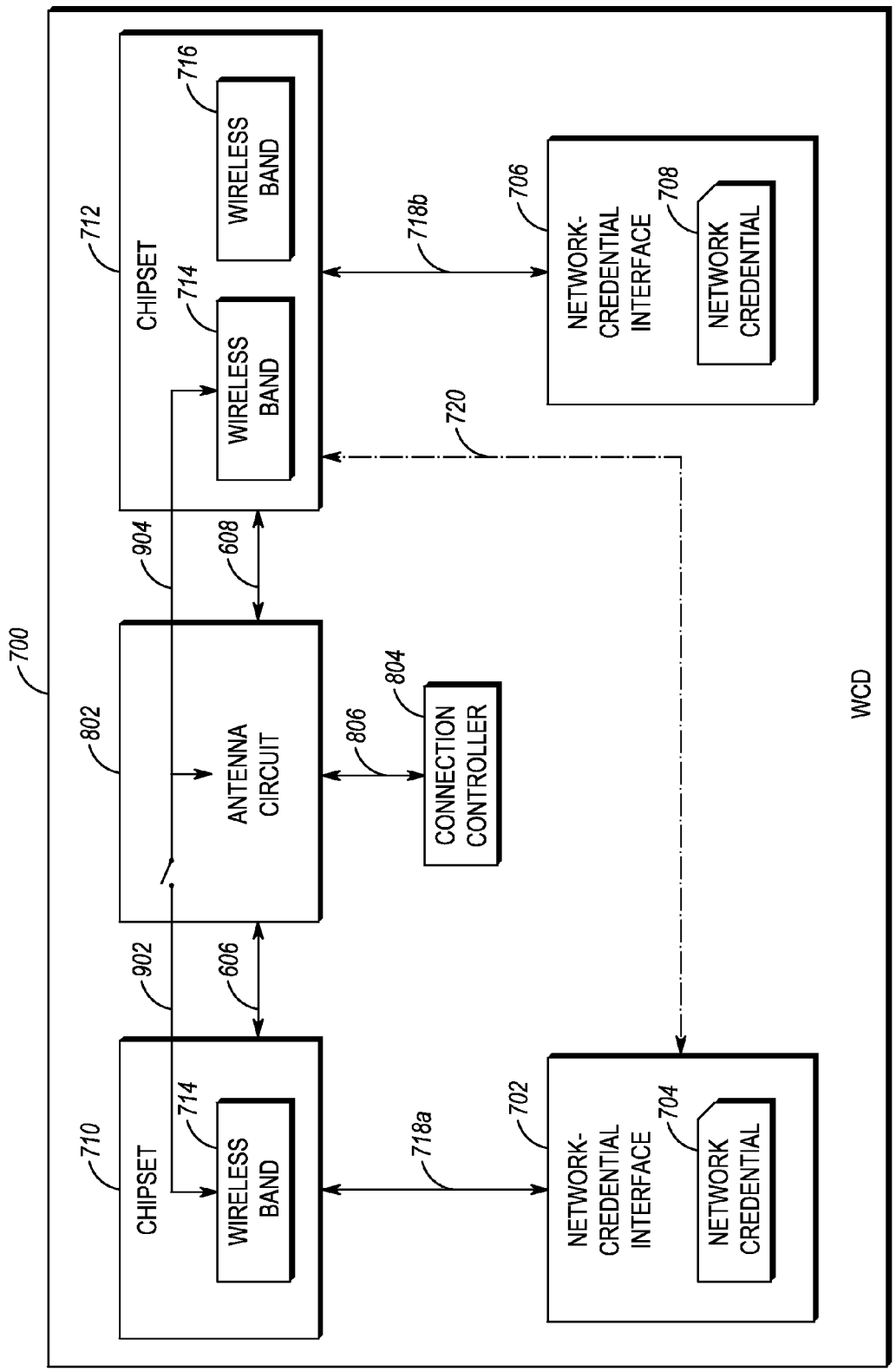
FIG. 10 depicts a further example of the WCD of FIG. 8 in a second mode of operation, in accordance with an embodiment.

FIG. 10 depicts a further example of the WCD of FIG. 8 in a second mode of operation, in accordance with an embodiment. In particular, FIG. 10 depicts the antenna circuit 802 after receiving, from the connection controller 804, an indication that the WCD 700 is in the second network-switching mode. The connection 902 is a disabled connection between the antenna circuit 802 and the wireless band 714 of the first chipset 710. The connection 904 connects the antenna circuit 802 with the wireless band 714 of the second chipset 712. In the second network-switching mode, the antenna circuit 802 routes data that is sent or received using the wireless band 714 via the second chipset 712.

Figure 11:
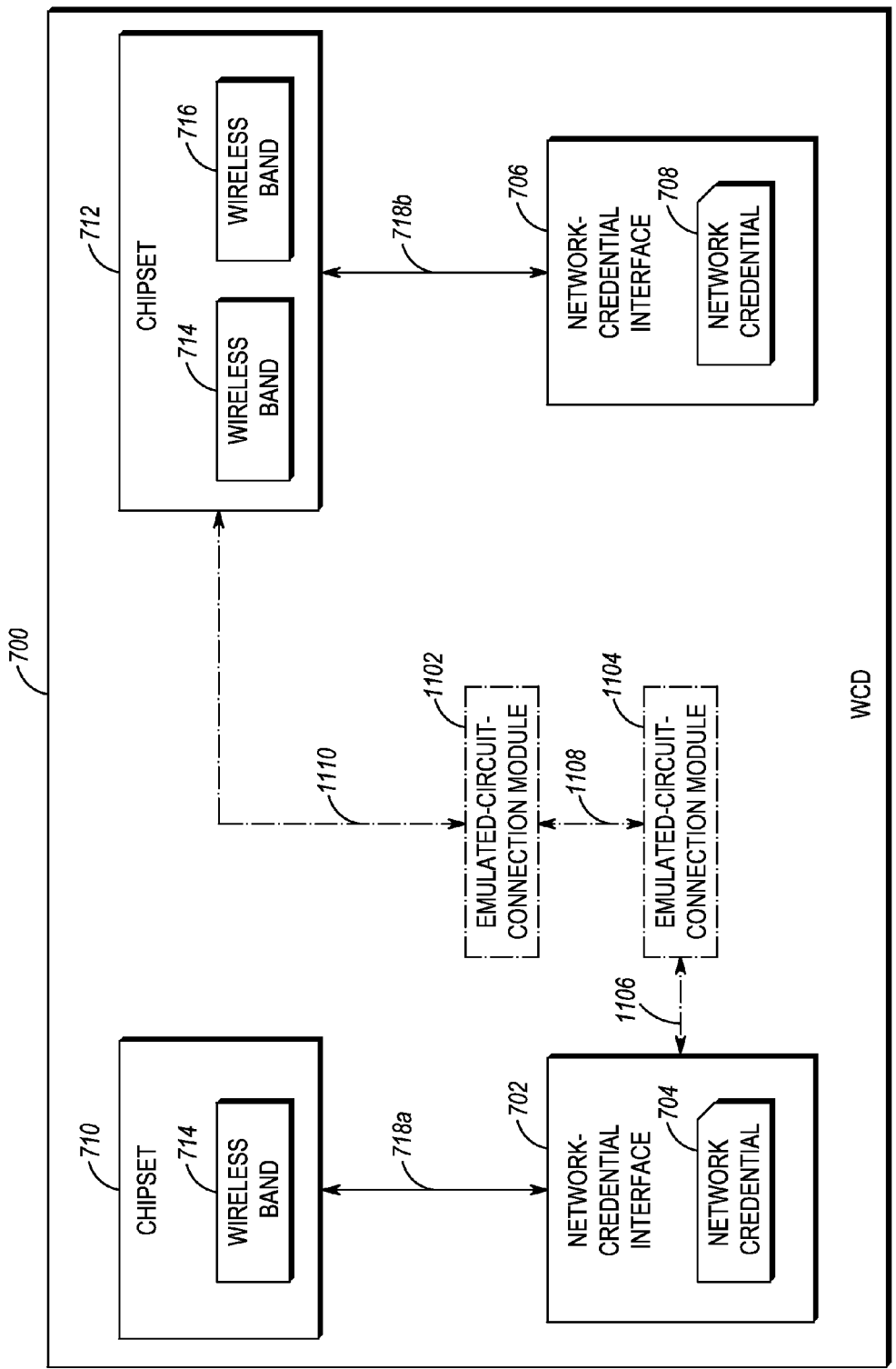
FIG. 11 depicts a further example of the WCD of FIG. 7 with a first example emulated circuit connection, in accordance with an embodiment.

FIG. 11 depicts a further example of the WCD of FIG. 7 with a first example emulated circuit connection, in accordance with an embodiment. Indeed, FIG. 11 depicts the emulated circuit connection 720 of FIG. 7 in greater detail, in accordance with at least one embodiment. In the example that is depicted in FIG. 11, the example WCD 700 includes a first emulated-circuit-connection module 1102 and a second emulated-circuit-connection module 1104. In such an embodiment, the first emulated-circuit-connection module 1102 is configured to communicate with the second chipset 712 via a connection 1110 and with the second emulated-circuit-connection module 1104 via a connection 1108. The second emulated-circuit-connection module 1104 is configured to communicate with the first emulated-circuit-connection module 1102 via the connection 1108 and with the first network-credential interface 702 via a connection 1106. Thus, in the example that is depicted in FIG. 11, the emulated circuit connection 720 includes the modules and connections 1102-1110.

Each emulated-circuit-connection module 1102 and 1104 may be implemented as an independent integrated circuit or may be combined with some other processing unit (e.g., the processor 504 of FIG. 5). In at least one embodiment, each of the emulated-circuit-connection modules 1102 and 1104 is software, implemented as a set of instructions executable by a processor for causing the example WCD 700 to carry out a set of functions that enable the WCD 700 to obtain wireless service on the first wireless band 714 via the second chipset 712 at least in part by allowing the second chipset 712 to access the first network credential 704. In at least one embodiment, the first and second emulated-circuit-connection modules are implemented as complementary modules of a remote API that cooperatively facilitate the second chipset 712 accessing the first network credential via the first network-credential interface 704. And certainly other implementations could be used.

Figure 12:
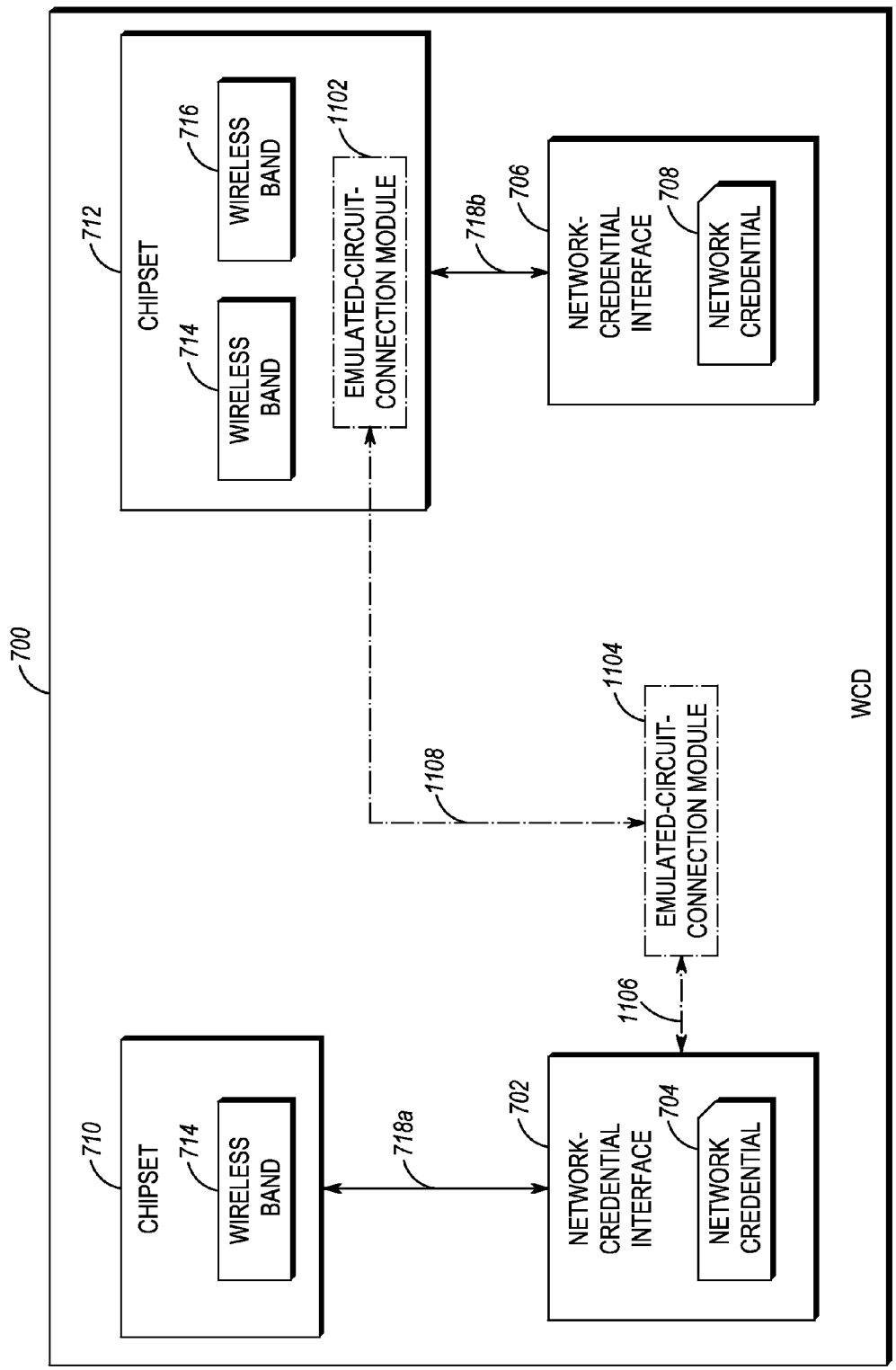
FIG. 12 depicts a further example of the WCD of FIG. 7 with a second example emulated circuit connection, in accordance with an embodiment.

FIG. 12 depicts a further example of the WCD of FIG. 7 with a second example emulated circuit connection, in accordance with an embodiment. In particular, FIG. 12 depicts the example WCD 700 of FIG. 7, where the first emulated-circuit-connection module 1102 resides on the second chipset 712. And certainly those having skill in the relevant art could implement the emulated circuit connection 720 in various other ways, as the examples provided herein are for purposes of illustration and are not provided by way of limitation.

In the present disclosure, various elements of one or more of the described embodiments are referred to as modules that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the art in a given context and/or for a given implementation. Each described module also includes instructions executable for carrying out the one or more functions described as being carried out by the particular module, where those instructions could take the form of or include hardware (i.e., hardwired) instructions, firmware instructions, software instructions, and/or the like, stored in any non-transitory computer-readable medium deemed suitable by those of skill in the art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method carried out by a wireless-communication device having a first chipset and a second chipset, the first chipset being compatible with each of a first wireless band and a second wireless band, the second chipset being compatible with each of the first wireless band and a third wireless band, wherein the first, second, and third wireless bands are respectively associated with corresponding first, second, and third networks, the method comprising:
  selecting a network-switching mode from among a plurality of network-switching modes that each implement switching among two or more of the first, second, and third networks, the plurality of network-switching modes comprising a first-network switching mode and a second network-switching mode;
  responsive to selecting the first network-switching mode with respect to the first and second networks, obtaining wireless service on the first wireless band via the first chipset;
  responsive to selecting the first network-switching mode with respect to the first and third networks, obtaining wireless service on the first wireless band via the second chipset;
  responsive to selecting the second network-switching mode with respect to the first and second networks, obtaining wireless service on the first wireless band via the second chipset; and
  responsive to selecting the second network-switching mode with respect to the first and third networks, obtaining wireless service on the first wireless band via the first chipset.

2. The method of claim 1, wherein switching among networks in a given set of networks while operating according to the first network-switching mode comprises roaming among the networks in the given set of networks.

3. The method of claim 1, wherein switching among networks in a given set of networks while operating according to the second network-switching mode comprises fast-network switching among the networks in the given set of networks.

4. The method of claim 1, wherein selecting a network-switching mode comprises selecting a network-switching mode based on one or more of: maintenance of session continuity; a time of day; a location of the wireless-communication device; a mobility pattern of the wireless-communication device; security credentials supported by each of the first and second chipsets; the respective sets of wireless bands supported by each of the first and second chipsets; applications supported by each of the first and second chipsets; applications supported by one or more of the first, second, and third networks; a network load of one or more of the first, second, and third networks; a cost of operating on one or more of the first, second, and third networks; relative ratio of commercial-network coverage to public-safety-network coverage; and a selection of a network from among the first, second, and third networks as a home network for the wireless-communication device.

5. The method of claim 4, wherein selecting a network-switching mode comprises selecting a network-switching mode based on a selection of a network from among the first, second, and third networks as the home network for the wireless-communication device, the method further comprising:
  receiving the selection of the home network from an infrastructure.

6. The method of claim 1, wherein selecting a network-switching mode comprises selecting a network-switching mode locally at the wireless-communication device.

7. The method of claim 1, further comprising:
  receiving from an access network an indication of whether to select the first network-switching mode or the second network-switching mode,
  wherein selecting a network-switching mode comprises selecting a network-switching mode based at least in part on the received indication.

8. The method of claim 1, wherein exactly two of the first, second, and third networks are operated by a same service provider.

9. A wireless-communication device comprising:
  a communication interface comprising a first chipset and a second chipset, the first chipset being compatible with each of a first wireless band and a second wireless band, the second chipset being compatible with each of the first wireless band and a third wireless band, wherein the first, second, and third wireless bands are respectively associated with corresponding first, second, and third networks;
  a processor; and
  data storage containing instructions executable by the processor for causing the wireless-communication device to carry out a set of functions, the set of functions including:
    selecting a network-switching mode from among a plurality of network-switching modes that each implement switching among two or more of the first, second, and third networks, the plurality of network-switching modes comprising a first-network switching mode and a second network-switching mode;
    responsive to selecting the first network-switching mode with respect to the first and second networks, obtaining wireless service on the first wireless band via the first chipset;
    responsive to selecting the first network-switching mode with respect to the first and third networks, obtaining wireless service on the first wireless band via the second chipset;
    responsive to selecting the second network-switching mode with respect to the first and second networks, obtaining wireless service on the first wireless band via the second chipset; and responsive to selecting the second network-switching mode with respect to the first and third networks, obtaining wireless service on the first wireless band via the first chipset.

10. The wireless-communication device of claim 9, wherein switching among networks in a given set of networks while operating according to the first network-switching mode comprises roaming among the networks in the given set of networks.

11. The wireless-communication device of claim 9, wherein switching among networks in a given set of networks while operating according to the second network-switching mode comprises fast-network switching among the networks in the given set of networks.

12. The wireless-communication device of claim 9, wherein selecting a network-switching mode comprises selecting a network-switching mode based on one or more of: maintenance of session continuity; a time of day; a location of the wireless-communication device; a mobility pattern of the wireless-communication device; security credentials supported by each of the first and second chipsets; the respective sets of wireless bands supported by each of the first and second chipsets; applications supported by each of the first and second chipsets; applications supported by one or more of the first, second, and third networks; a network load of one or more of the first, second, and third networks; a cost of operating on one or more of the first, second, and third networks; relative ratio of commercial-network coverage to public-safety-network coverage; and a selection of a network from among the first, second, and third networks as a home network for the wireless-communication device.

13. The wireless-communication device of claim 12, wherein selecting a network-switching mode comprises selecting a network-switching mode based on a selection of a network from among the first, second, and third networks as the home network for the wireless-communication device, the set of functions further comprising:
receiving the selection of the home network from an infrastructure.

14. The wireless-communication device of claim 9, wherein selecting a network-switching mode comprises selecting a network-switching mode locally at the wireless-communication device.

15. The wireless-communication device of claim 9, the set of functions further comprising:
receiving from an access network an indication of whether to select the first network-switching mode or the second network-switching mode,
wherein selecting a network-switching mode comprises selecting a network-switching mode based at least in part on the received indication.

16. The wireless-communication device of claim 9, wherein exactly two of the first, second, and third networks are operated by a same service provider.

17. A wireless-communication device comprising:
a first network-credential interface having access to a first network credential;
a second network-credential interface having access to a second network credential;
a first chipset that is compatible with a first wireless band;
a second chipset that is compatible with each of the first wireless band and a second wireless band, wherein the first and second wireless bands are respectively associated with corresponding first and second networks;
a first direct circuit connection between the first chipset and the first network-credential interface, wherein the wireless-communication device is operable to obtain wireless service on the first wireless band via the first chipset at least in part by the first chipset accessing the first network credential over the first direct circuit connection;
a second direct circuit connection between the second chipset and the second network-credential interface, wherein the wireless-communication device is operable to obtain wireless service on the second wireless band via the second chipset at least in part by the second chipset accessing the second network credential over the second direct circuit connection; and
an emulated circuit connection between the second chipset and the first network-credential interface, wherein the wireless-communication device is operable to obtain wireless service on the first wireless band via the second chipset at least in part by the second chipset accessing the first network credential over the emulated circuit connection.

18. The wireless-communication device of claim 17, wherein the first network credential is a commercial network credential, wherein the first wireless band is a commercial wireless band, wherein the second network credential is a public-safety network credential, and wherein the second wireless band is a public-safety wireless band.

19. The wireless-communication device of claim 17, wherein the emulated circuit connection comprises first and second emulated-circuit-connection modules, wherein the first emulated-circuit-connection module is configured to communicate with the second chipset and with the second emulated-circuit-connection module, wherein the second emulated-circuit-connection module is configured to communicate with the first emulated-circuit-connection module and with the first network-credential interface.

20. The wireless-communication device of claim 19, wherein the first emulated-circuit-connection module resides on the second chipset.

* * * * *